(12) United States Patent
Fujishiro

(10) Patent No.: US 12,501,238 B2
(45) Date of Patent: Dec. 16, 2025

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 380 days.

(21) Appl. No.: 18/164,253

(22) Filed: Feb. 3, 2023

(65) Prior Publication Data

US 2023/0188950 A1 Jun. 15, 2023

Related U.S. Application Data

(63) Continuation of application No. PCT/JP2021/028863, filed on Aug. 3, 2021.

(30) Foreign Application Priority Data

Aug. 5, 2020 (JP) ................................. 2020-133053

(51) Int. Cl.
*H04W 4/06* (2009.01)

(52) U.S. Cl.
CPC ..................... *H04W 4/06* (2013.01)

(58) Field of Classification Search
CPC ........ H04W 4/06; H04W 76/15; H04W 28/04
See application file for complete search history.

(56) References Cited

U.S. PATENT DOCUMENTS

| | | | |
|---|---|---|---|
| 7,493,108 B2 | 2/2009 | Beming et al. | |
| 8,014,772 B2 | 9/2011 | Beming et al. | |
| 8,649,311 B2 | 2/2014 | Xu et al. | |
| 8,693,413 B2 | 4/2014 | Kanazawa et al. | |
| 9,356,341 B1 | 5/2016 | Meador et al. | |
| 10,440,607 B2 | 10/2019 | Fujishiro et al. | |
| 10,952,096 B2 | 3/2021 | Fujishiro et al. | |
| 12,245,303 B2 * | 3/2025 | Babaei | H04L 5/0048 |
| 2008/0267109 A1 | 10/2008 | Wang et al. | |
| 2012/0195221 A1 | 8/2012 | Wang et al. | |
| 2013/0128796 A1 | 5/2013 | Newberg et al. | |

(Continued)

FOREIGN PATENT DOCUMENTS

| | | |
|---|---|---|
| JP | 2006-516080 A | 6/2006 |
| JP | 2010-525763 A | 7/2010 |

(Continued)

OTHER PUBLICATIONS

CMCC, "Discussion on group scheduling for MBS", 3GPP TSG-RAN WG2 Meeting #114 electronic, R2-2106241, Online, May 19-27, 2021, total 10 pages.

(Continued)

*Primary Examiner* — Abdullahi Ahmed
(74) *Attorney, Agent, or Firm* — Studebaker Brackett PLLC

(57) ABSTRACT

A communication control method is used in a mobile communication system including a base station for providing a multicast broadcast service (MBS) to a user equipment. The communication control method includes transmitting, by the user equipment configured to receive MBS data via an MBS communication path, to the base station, notification information notifying a desire of the user equipment related to configuration of a unicast communication path associated with the MBS communication path.

6 Claims, 13 Drawing Sheets

(56) References Cited

U.S. PATENT DOCUMENTS

| | | | | |
|---|---|---|---|---|
| 2019/0386779 A1* | 12/2019 | Hong | ................ | H04W 28/0252 |
| 2021/0068004 A1* | 3/2021 | Kadiri | ..................... | H04L 47/15 |
| 2021/0204248 A1* | 7/2021 | Zhang | ..................... | H04W 4/06 |
| 2022/0286818 A1* | 9/2022 | Chin | ....................... | H04W 4/06 |
| 2022/0312525 A1* | 9/2022 | Chin | ....................... | H04W 28/06 |
| 2022/0321280 A1* | 10/2022 | Wei | ....................... | H04L 1/1822 |
| 2024/0064831 A1* | 2/2024 | Babaei | ................. | H04W 76/15 |

FOREIGN PATENT DOCUMENTS

| | | |
|---|---|---|
| JP | 2012-531135 A | 12/2012 |
| WO | 2009/098892 A1 | 8/2009 |
| WO | 2013/074288 A1 | 5/2013 |
| WO | 2016/163548 A1 | 10/2016 |

OTHER PUBLICATIONS

"3rd Generation Partnership Project; Technical Specification Group Radio Access Network; NR; NR and NG-RAN Overall Description; Stage 2", Release 16, 3GPP TS 38.300 V16.2.0, Jul. 2020, pp. 1-148.

\* cited by examiner

COMMUNICATION CONTROL METHOD

RELATED APPLICATIONS

The present application is a continuation based on PCT Application No. PCT/JP2021/028863, filed on Aug. 3, 2021, which claims the benefit of Japanese Patent Application No. 2020-133053 filed on Aug. 5, 2020. The content of which is incorporated by reference herein in their entirety.

TECHNICAL FIELD

The present disclosure relates to a communication control method used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth generation radio access technology.

CITATION LIST

Non-Patent Literature

NPL 1: 3GPP Technical Specification "3GPP TS 38.300 V16.2.0 (2020-07)"

SUMMARY

A first aspect provides a communication control method used in a mobile communication system including a base station for providing a multicast broadcast service (MBS) to a user equipment, the communication control method including transmitting, by the user equipment configured to receive MBS data via an MBS communication path, to a base station, notification information notifying a desire of the user equipment related to configuration of a unicast communication path associated with the MBS communication path.

A second aspect provides a communication control method used in a mobile communication system including a base station for providing a multicast broadcast service (MBS) to a user equipment, the communication control method including transmitting, by the user equipment receiving MBS data via an MBS bearer, to the base station, feedback information identifying target MBS data corresponding to the MBS data having failed to be received, and retransmitting, by the base station, based on the feedback information, the target MBS data to the user equipment by using a unicast bearer associated with the MBS bearer.

A third aspect provides a communication control method used in a mobile communication system including a base station for providing a multicast broadcast service (MBS) to a user equipment, the communication control method including configuring, by the base station configured to transmit MBS data via an MBS bearer, a logical channel identifier related to the MBS for the user equipment.

DESCRIPTION OF EMBODIMENTS

Introduction of multicast broadcast services to the 5G system (NR) has been under study. NR multicast broadcast services are desired to provide enhanced services compared to LTE multicast broadcast services.

The present disclosure provides enhanced multicast broadcast services.

A mobile communication system according to an embodiment will be described with reference to the drawings. In the description of the drawings, the same or similar parts are denoted by the same or similar reference signs.

Figure 1:
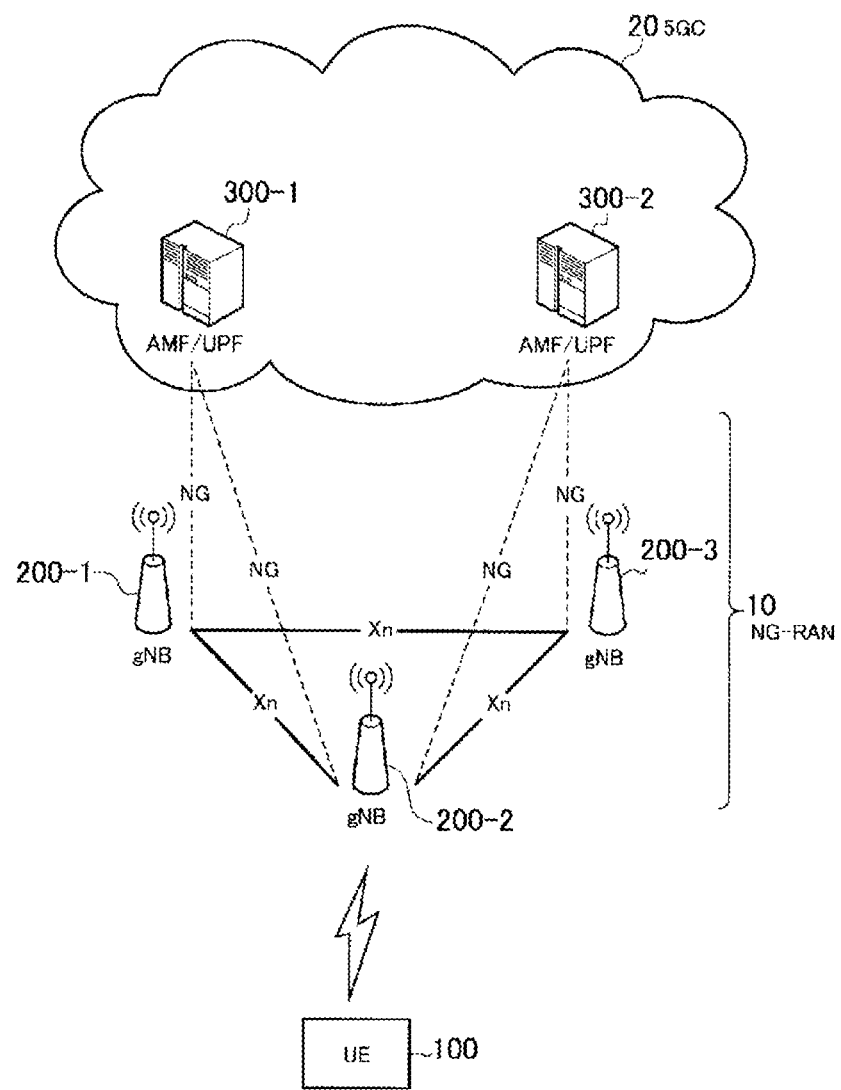
FIG. 1 is a diagram illustrating a configuration of a mobile communication system according to an embodiment.

Configuration of Mobile Communication System First, a configuration of a mobile communication system according to an embodiment will be described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system.

As illustrated in FIG. 1, the mobile communication system includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface, which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and UPF are connected to the gNB 200 via an NG interface, which is an interface between a base station and the core network.

Figure 2:
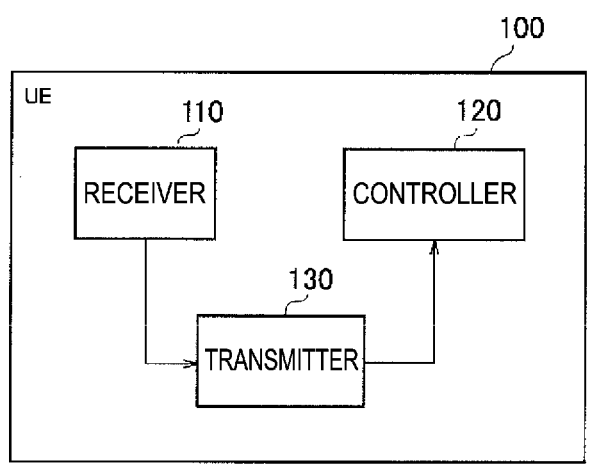
FIG. 2 is a diagram illustrating a configuration of a User Equipment (UE) according to the embodiments.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
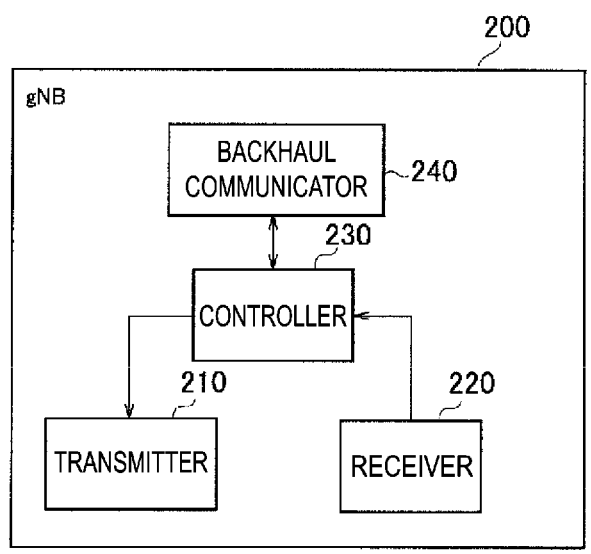
FIG. 3 is a diagram illustrating a configuration of a base station (gNB) according to the embodiments.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
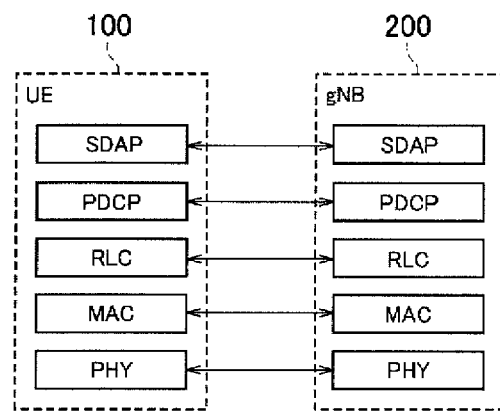
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an internet protocol (IP) flow as the unit of quality of service (QoS) control performed by a core network and a radio bearer as the unit of QoS control performed by an access stratum (AS). Note that, when the RAN is connected to the EPC, the SDAP may not be provided.

Figure 5:
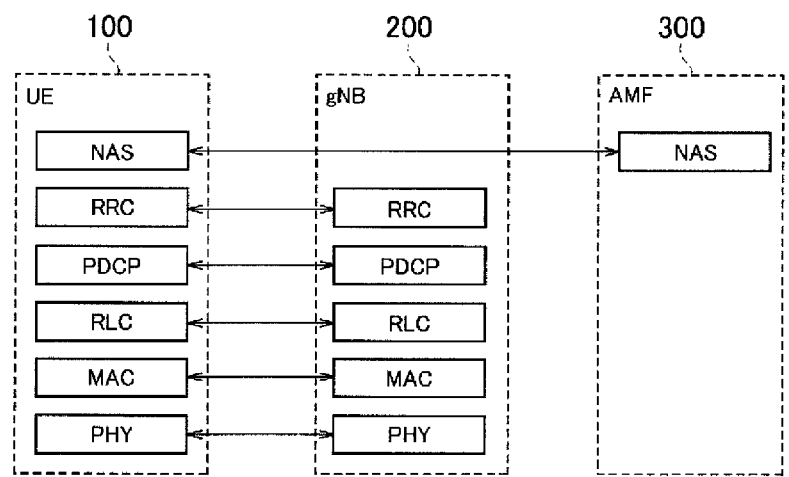
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signalling is transmitted between the NAS layer of the UE 100 and the NAS layer of the AMF 300.

Note that the UE 100 includes an application layer other than the protocol of the radio interface.

MBS

An MBS according to an embodiment will be described. The MBS is a service in which the NG-RAN 10 provides broadcast or multicast, that is, point-to-multipoint (PTM) data transmission to the UE 100. The MBS may be referred to as the Multimedia Broadcast and Multicast Service (MBMS). Note that use cases (service types) of the MBS include public communication, mission critical communication, V2X (Vehicle to Everything) communication, IPv4 or IPv6 multicast delivery, IPTV, group communication, and software delivery.

Figure 6:
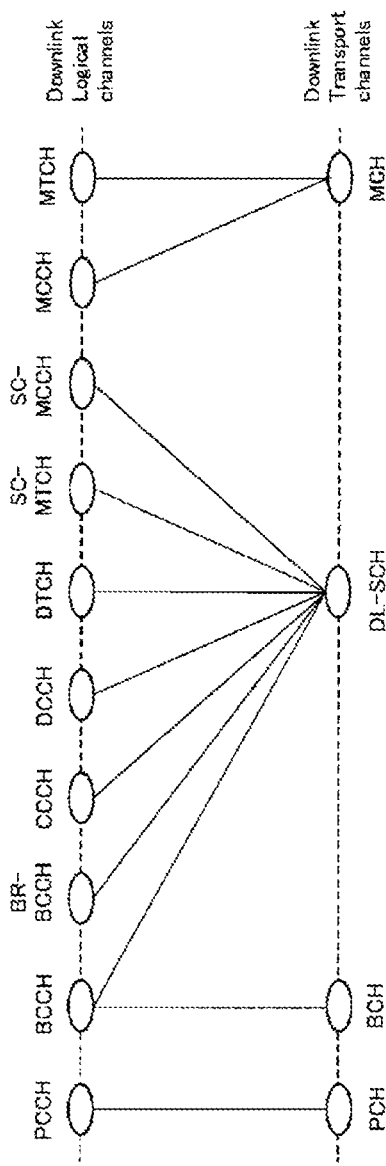
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Shared Channel (PDSCH), and enables dynamic resource allocation.

Although an example will be mainly described below in which the MBS is provided using the SC-PTM transmission scheme, the MBS may be provided using the MBSFN transmission scheme. An example will be mainly described in which the MBS is provided using multicast. Accordingly, the MBS may be interpreted as multicast. Note that, the MBS may be provided using broadcast.

In the description below, the MBS data refers to data transmitted by the MBS, but in the embodiments described below, the MBS data may be transmitted by unicast. An MBS control channel refers to the MCCH or SC-MCCH, and an MBS traffic channel refers to the MTCH or SC-MTCH.

The network can provide different MBS services for respective MBS sessions. The MBS service is identified by Temporary Mobile Group Identity (TMGI) and/or a session identifier, and at least one of these identifiers is referred to as an MBS service identifier. Such an MBS service identifier may be referred to as an MBS session identifier or a multicast group identifier. The MBS service identifier may include a group radio network temporary identifier (RNTI).

Operations of Mobile Communication System

Given the mobile communication system and MBS described above, operations of a mobile communication system will be described.

(1) Configuration Operation for Unicast Bearer

Figure 7:
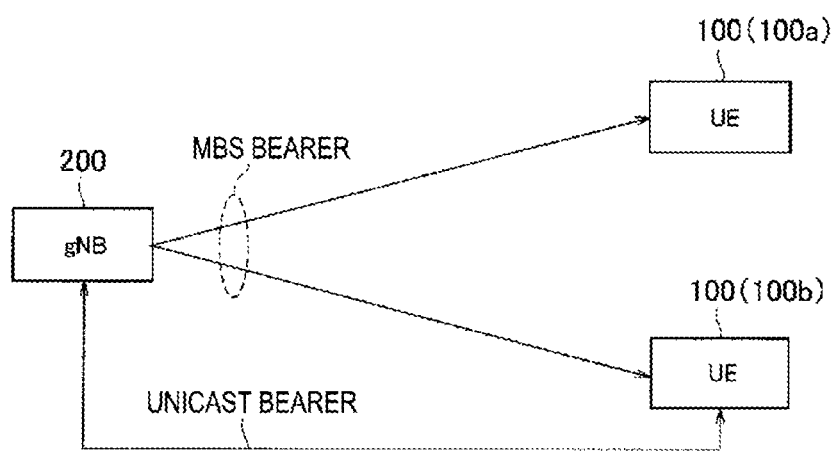
FIG. 7 is a diagram illustrating an overview of operations according to an embodiment.

FIG. 7 is a diagram illustrating an overview of operations according to an embodiment.

As illustrated in FIG. 7, the UE 100*a* and the UE 100*b* have established an MBS bearer with the gNB 200. The MBS bearer refers to a bearer used for MBS transmission and MBS reception of MBS data. The gNB 200 transmits the same MBS data to the UE 100*a* and the UE 100*b* via the MBS bearer by using multicast (or broadcast).

The UE 100*b* has established a unicast bearer associated with the MBS bearer, with the gNB 200. The unicast bearer refers to a bearer used for unicast communication. The gNB 200 and the UE 100*b* perform, via the unicast bearer, unicast communication associated with the MBS. The unicast bearer is utilized for high-reliability MBS distribution as described below.

The unicast bearer may be used for duplication transmission using the MBS bearer and the unicast bearer. The gNB 200 transmits the same MBS data in a duplicate manner on the MBS bearer and the unicast bearer. A cell in which the MBS bearer is transmitted may be different from a cell in which the unicast bearer is transmitted.

The unicast bearer may be used as an alternative path (alternative transmission path) for the MBS bearer. When the UE 100*b* has difficulty in continuing MBS reception on the MBS bearer, the gNB 200 switches the transmission of the MBS data to the UE 100*b* to the unicast bearer.

The unicast bearer may be used for retransmission of the MBS data. The gNB 200 transmits to the UE 100*b* MBS data that the UE 100*b* has failed in MBS reception on the MBS bearer, through unicast by using the unicast bearer.

In the example illustrated in FIG. 7, the UE 100*a* has not established the unicast bearer associated with the MBS bearer, with the gNB 200. From the perspective of saving radio resources and power consumption, the UE 100*a* preferably does not establish the unicast bearer as far as the UE 100*a* has no MBS reception quality issue. On the other hand, when the MBS reception quality of the UE 100*a* is degraded, the UE 100*a* desirably establishes the unicast bearer and enables high-reliability MBS reception.

In an embodiment, the UE 100 that receives MBS data via the MBS bearer transmits, to the gNB 200, notification information for notifying a desire of the UE 100 related to the configuration of the unicast bearer associated with the MBS bearer. The notification information is information indicating at least one selected from the group consisting of a desire of the UE 100 to establish the unicast bearer, a desire for duplication reception using the MBS bearer and the unicast bearer, a desire to switch from reception on the MBS bearer to reception on the unicast bearer, and a desire for retransmission using the unicast bearer.

Note that the reception of the MBS data is not limited to actual receiving of the MBS data, and may be an attempt to receive MBS data (taking interest in reception).

The UE 100 may transmit the notification information in response to the reception quality being lower than a certain criterion during the MBS reception via the MBS bearer.

The notification information may include at least one selected from the group consisting of the identifier (bearer identifier) of the MBS bearer, the identifier (bearer identifier) of the unicast bearer, an MBS service identifier corresponding to the MBS data, the identifier of a cell corresponding to the MBS bearer, the identifier of a cell corresponding to the unicast bearer, a measurement result related to MBS reception, and information indicating that the MBS reception quality is lower than the certain criterion.

Figure 8:
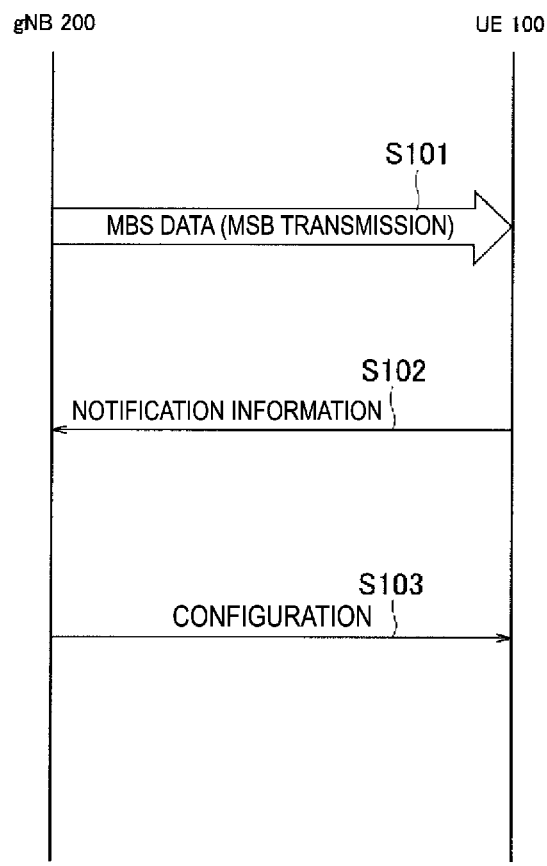
FIG. 8 is a diagram illustrating an example of operations according to an embodiment.

FIG. 8 is a diagram illustrating an example of operations according to an embodiment.

As illustrated in FIG. 8, in step S101, the gNB 200 performs MBS transmission of MBS data. The UE 100 starts receiving the MBS data. The UE 100 is in the RRC connected state, the RRC idle state, or the RRC inactive state. Note that, the UE 100 may be in a state of taking interest in receiving the MBS data but having yet to start receiving the MBS data. The state of taking interest in receiving the MBS data may correspond to a state where the user or application has requested reception of the MBS data.

In step S102, the UE 100 transmits, to the gNB 200, the notification information for notifying a desire of the UE 100 related to the configuration of the unicast bearer associated with the MBS bearer.

The UE 100 may transmit the notification information in response to the reception quality being lower than the certain criterion during MBS reception. The reception quality may be associated with packet loss. For example, the reception quality being lower than the certain criterion refers to a reception error occurring, a packet loss (packet loss rate or packet loss amount) being higher than a threshold value, or the number of HARQ NACKs (the number of transmissions) being greater than a threshold value. The reception quality may be associated with received power. For example, the reception quality being lower than the certain criterion refers to the received power or reception quality (RSRP, RSRQ, SINR, etc.) being lower than a threshold value. These threshold values may be configured for the UE 100 in advance by the gNB 200, or the UE 100 may determine a threshold value from a QoS parameter for the MBS service. The UE 100 may transmit the notification information in response to the reception quality during MBS reception being lower than the certain criterion for a continuous period of time. The certain period of time may be configured for the UE 100 in advance by the gNB 200. Note that the UE 100 may transmit the notification information to the gNB 200 regardless of the MBS reception state.

The notification information is information indicating at least one selected from the group consisting of the desire of the UE 100 to establish a unicast bearer (and/or associate the unicast bearer with the MBS bearer), a desire for duplication reception using the MBS bearer and the unicast bearer, a desire to switch from reception on the MBS bearer to reception on the unicast bearer, and a desire for retransmission using the unicast bearer. The desire for duplication reception may be a desire for an already established bearer, or may be a desire for a bearer to be newly established. The desire to switch from reception on the MBS bearer to reception on the unicast bearer may be replaced with the desire to switch from reception on the unicast bearer to reception on the MBS bearer. The notification information may be an information element indicating a desire for high-reliability reception (e.g., highReliabilityENUM (true)). An upper layer (such as the application) of the UE 100 may configure whether high reliability is required. The notification information may be associated with the MBS service identifier (or group RNTI) and/or the bearer identifier (logical channel identifier). Instead of notifying a definite desire (preference), the notification information may be a "report information indicating that the reception state of the MBS bearer has worsened."

The notification information may include at least one selected from the group consisting of a target bearer identifier, an MBS bearer identifier, a unicast bearer identifier (or a logical channel identifier), a target MBS service identifier, a target cell identifier (identifier of a cell corresponding to the current MBS bearer and/or a cell corresponding to the unicast bearer), the measurement result (e.g., RSRP/RSRQ/SINR, a packet loss of the MBS), cause information (e.g., the reception quality during MBS reception being lower than a certain criterion), and the sequence number of the MBS desired to start being received.

When the UE 100 is in the RRC connected state, the UE 100 may include and transmit the notification information in a UE Assistance Information message or an MBS interest indication message that is a type of RRC message. When the UE 100 is in the RRC idle state or the RRC inactive state, the UE 100 may include and transmit the notification information in Msg3 (RRC Setup Request message or the RRC Resume Request message) or Msg5 (RRC Setup Complete message or the RRC Resume Complete message) used in a random access procedure. In this case, the notification information may be the cause information (Cause) included in the message. When the UE 100 is in the RRC connected state, the RRC idle state, or the RRC inactive state, the UE 100 may transmit, as the notification information, a random access preamble used in the random access procedure. In this case, the gNB 200 uses, for example, the system information to allocate a dedicated PRACH resource to the UE 100 for notification.

In step S103, the gNB 200 performs, on the UE 100, a configuration based on the notification information from the UE 100. For example, the gNB 200 performs any of a configuration in which the UE 100 establishes the unicast bearer (and/or associates the unicast bearer with the MBS bearer), a configuration for the duplication reception using the MBS bearer and the unicast bearer, a configuration for switching from reception on the MBS bearer to reception on the unicast bearer, and a configuration for retransmission using the unicast bearer. When the gNB 200 cannot establish a unicast bearer for the UE 100, the gNB 200 may hand over the UE 100. The gNB 200 may only consider scheduling such as changing a modulation and coding scheme (MCS) for MBS transmission based on the notification information. When the UE 100 is in the RRC idle state or the RRC inactive state, the gNB 200 may establish an RRC connection with the UE 100.

(2) Retransmission Operation Using Unicast Bearer

According to an embodiment, a retransmission operation using the unicast bearer will be described. The utilization of radio resources is low in the duplication transmission and/or reception described above, and thus during MBS transmission and/or reception, the unicast bearer is preferably used only for retransmission of the MBS data.

In an embodiment, the UE 100 receiving the MBS data via the MBS bearer transmits, to the gNB 200, feedback information for identifying the target MBS data which is the MBS data having failed to be received. Based on the feedback information from the UE 100, the gNB 200 retransmits the target MBS data to the UE 100 by unicast using the unicast bearer associated with the MBS bearer.

Thus, the gNB 200 performs the initial transmission of the MBS data by using MBS transmission, and uses unicast transmission only when performing retransmission due to failure of reception of the MBS data. This allows the reliability and the utilization of radio resources to be improved in the MBS.

The UE 100 may transmit the feedback information in response to the MBS data not being received via the MBS bearer for a continuous period of time or the number of packets of IBS data having failed to be received via the MBS bearer being greater than a threshold value.

The feedback information may include at least one selected from the group consisting of sequence number information for identifying the MBS data that the UE 100 has failed to receive and the identifier related to the NIBS bearer.

Figure 9:
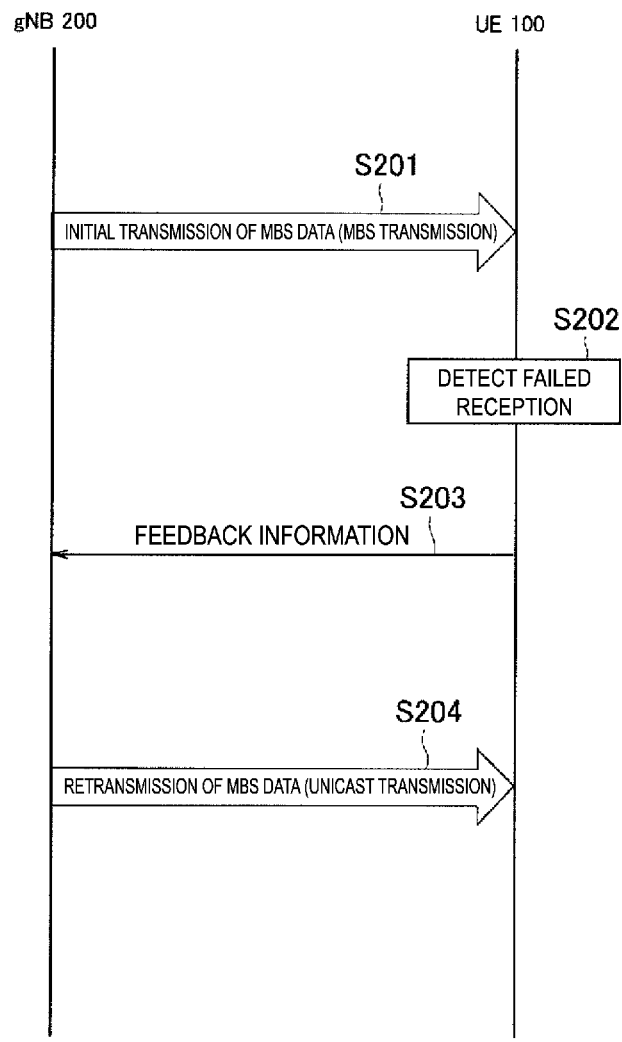
FIG. 9 is a diagram illustrating an example of a retransmission operation using a unicast bearer according to an embodiment.

FIG. 9 is a diagram illustrating an example of a retransmission operation using the unicast bearer according to an embodiment. In this example, the UE 100 is assumed to be in the RRC inactive state and to have established an MBS bearer and a unicast bearer.

As illustrated in FIG. 9, in step S201, the gNB 200 performs MBS transmission of the MBS data. The UE 100 starts receiving the MBS data.

In step S202, the UE 100 detects failed reception of the MBS data. The UE 100 may store the sequence number of the MBS data (packet) having failed to be received. Detecting the failed reception means that a data decoding error has occurred or that a timer for awaiting reception has timed out.

In step S203, when a predetermined condition is satisfied, the UE 100 transmits, to the gNB 200, the feedback information based on step S202.

The predetermined condition is a combination of one or more of the condition that the timer expires, the condition that the number of packets having failed to be received (count value) exceeds the threshold value, and the condition that the upper layer (e.g., the RRC or application) provides an indication.

For the condition that the timer expires, the UE 100 restarts the timer (reboots from zero) every time when the UE 100 receives the packet corresponding to the MBS data. The timer value may be configured by the gNB 200, or may be configured to be equal to the period of time during which the upper layer (the MBS application or the like) in the UE 100 can wait for arrival of packets (e.g., the range of time in which the video is not disturbed). In the case that the timer value is configured by the application, the UE 100 may notify the gNB 200 of the configuration value in advance.

As for the condition that the number of packets having failed to be received (count value) exceeds the threshold value, the UE 100 resets (restarts from zero) the number of packets having failed to be received (count value) after transmitting the feedback information. The threshold value may be configured for the UE 100 by the upper layer or the gNB 200. The threshold value may be zero (i.e., a failure to receive one packet leads to immediate transmission). In other words, the UE 100 may perform notification when reception fails.

As for the condition that the upper layer (e.g., the RRC or application) provides an indication, the indication may involve any one of reestablishment or reconfiguration of an entity for a layer (e.g., the PDCP) terminating the bearer, release of a lower layer (e.g., the RLC), switching between unicast and MBS, and a data recovery request (at the time of handover or the like).

The UE 100 transmits status control Protocol Data Units (PDUs) for the PDCP to the gNB 200 as the feedback information. The UE 100 may transmit an RRC message, MAC Control Elements (CEs), or RLC control PDUs to the gNB 200 as the feedback information. When an MBS layer is present, the UE 100 may transmit a control packet of the MBS layer to the gNB 200 as the feedback information.

The feedback information includes sequence number information for identifying the MBS data that the UE 100 has failed to receive and/or the identifier related to the MBS bearer. The sequence number information may be a list of the sequence numbers of packets having failed to be received. The sequence number information may include a sequence number (starting point) and the number of packets, the sequence number corresponding to the first failed reception and the number of packets (the length of burst failure) corresponding to continuously failed receptions after the first failed reception (possibly including the first sequence number). The sequence number information may include a sequence number (starting point) and bit map information, the sequence number corresponding to the first failed reception and the bit map information (e.g., "0": failed reception, "1": successful reception) indicating the reception status of each packet after the first failed reception (possibly including the first sequence number). The sequence number information may be information related to successfully received packets (such as sequence numbers). The identifier related to the MBS bearer may be the MBS service identifier, the group RNTI, the bearer identifier, and/or the logical channel identifier.

In step S204, the gNB 200 identifies a packet that the UE 100 has failed to receive based on the feedback information in step S203, and retransmits the packet via the unicast bearer. Here, the following processing may be performed as an internal operation on the gNB 200 side. Specifically, when the UE 100 performs feedback notification using the above-described timer, the gNB 200 considers that after packet transmission, packets for which the timer value of the timer has elapsed have been successfully received by all the UEs 100. In other words, the gNB 200 activates the timer for each packet transmission, and when the timer expires, the corresponding packet is deleted from a retransmission buffer (excluded from retransmission targets).

The UE 100 attempts to receive a retransmitted packet on the unicast bearer. In the UE 100, the termination layer (for example, the PDCP) may perform order control (reordering) on the retransmitted packet received.

Note that, instead of unicast retransmission in step S204, the gNB 200 may perform MBS retransmission on an MBS bearer different from the MBS bearer used in step S201. The different MBS bearer may be, for example, an MBS bearer dedicated to retransmission such as an MBS bearer configured with a lower MCS. Retransmission may be performed by using a bearer (logical channel) for a secondary leg of duplication of MBS.

The gNB 200 may perform a combination of the unicast retransmission in step S204 and the retransmission of the MBS bearer. For example, a packet that a large number of UEs have failed to receive is retransmitted using the MBS bearer, and a packet that a small number of UEs have failed to receive is retransmitted using the unicast bearer. Here, the MBS bearer may be the same as the MBS bearer used in step S201, or a different MBS bearer (retransmission-dedicated MBS bearer) may be used as described above. The combination of these retransmission means allows data to be more efficiently delivered to a plurality of UEs.

Figure 10:
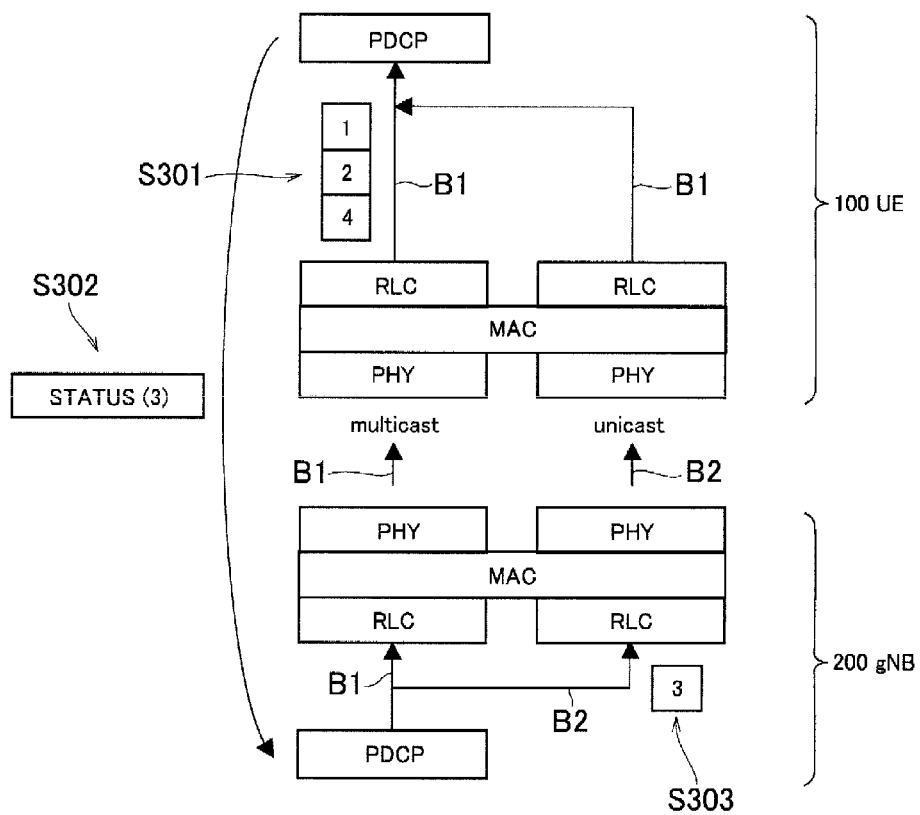
FIG. 10 is a diagram illustrating a specific example of the retransmission operation using the unicast bearer according to an embodiment.

FIG. 10 is a diagram illustrating a specific example of the retransmission operation using the unicast bearer according to an embodiment.

As illustrated in FIG. 10, the gNB 200 and the UE 100 have established an MBS bearer B1 and a unicast bearer B2. Specifically, the MB S bearer B1 and the unicast bearer B2 are established between a PDCP entity of the gNB 200 and a PDCP entity of the UE 100 (i.e., terminating in the PDCP layer).

In step S301, the PDCP entity of the gNB 200 transmits PDCP packets "1" to "4" to the UE 100 via the MBS bearer B1. Here, for example, the PDCP packet "3" disappears in a radio section, and the PDCP entity of the UE 100 succeeds in receiving the PDCP packet "1," "2," and "4," but fails to receive the PDCP packet "3."

In step S302, the PDCP entity of the UE 100 feeds back a PDCP status packet (status control PDU) indicating that reception of PDCP packet "3" has failed to the gNB 200 as feedback information.

In step S303, the PDCP entity of the gNB 200 retransmits PDCP packet "3" via the unicast bearer B2 based on the PDCP status packet from the UE 100. The PDCP entity of UE 100 receives PDCP packet "3" via the unicast bearer B2. The PDCP entity of the UE 100 may perform order control of the PDCP packets and discard duplicate packets.

Variations

Variations of the above-described embodiment will be described while focusing on differences from the above-described embodiment. The variations mainly focus on the operation of the RLC layer.

The RLC layer has three operating modes: an Acknowledged Mode (AM), an Unacknowledged Mode (UM), and a Transparent Mode (TM). Of these modes, only the AM supports the retransmission function based on automatic retransmission control (Automatic Repeat reQuest (ARQ)). In the AM, an RLC entity on a reception side performs ACK/NACK feedback (specifically, feedback of the STATUS PDU of the RLC layer) on an RLC entity on a transmission side to perform retransmission control.

For the operating mode in an LTE multicast service, the RLC entity is configured to operate in the UM. However, a mechanism that allows the AM to be applied to an NR multicast service is considered to improve the reliability and flexibility of the multicast communication. Accordingly, the variations assume that the RLC operates in the AM.

When the UE 100 transmits RLC feedback (STATUS PDU) to the gNB 200, the gNB 200 needs to be able to determine which logical channel identifier the feedback corresponds to. In particular, in performing MBS transmission for a plurality of MBS services, the gNB 200 has difficulty in appropriately controlling retransmission without recognizing which MBS service the feedback corresponds to.

In the variations, the gNB 200 that transmits the MBS data via the MBS bearer configures the logical channel identifier (LCID) related to the MBS for the UE 100. This allows communication control of the MBS to be performed on a per logical channel basis.

In the variations, the gNB 200 may configure an identical logical channel identifier for both the MBS transmission of the MBS data from the gNB 200 to the UE 100 and the unicast transmission related to the MBS. This clarifies the correspondence relationship between the MBS transmission and the unicast transmission.

(1) Variation 1

In Variation 1, the gNB 200 configures, for the UE 100, the logical channel identifier for transmission of RLC layer feedback information (RLC layer STATUS PDU) for the MBS data from the UE 100 to the gNB 200. Thus, the gNB 200 can recognize the logical channel on which the RLC layer feedback information for the MBS data is transmitted, allowing the appropriate retransmission control to be performed.

In Variation 1, the gNB 200 configures an identical logical channel identifier for both the MBS transmission of the MBS data from the gNB 200 to the UE 100 and the unicast transmission related to the MBS. Specifically, the unicast transmission transmits the RLC layer feedback information for the MBS data from the UE 100 to the gNB 200.

Figure 11:
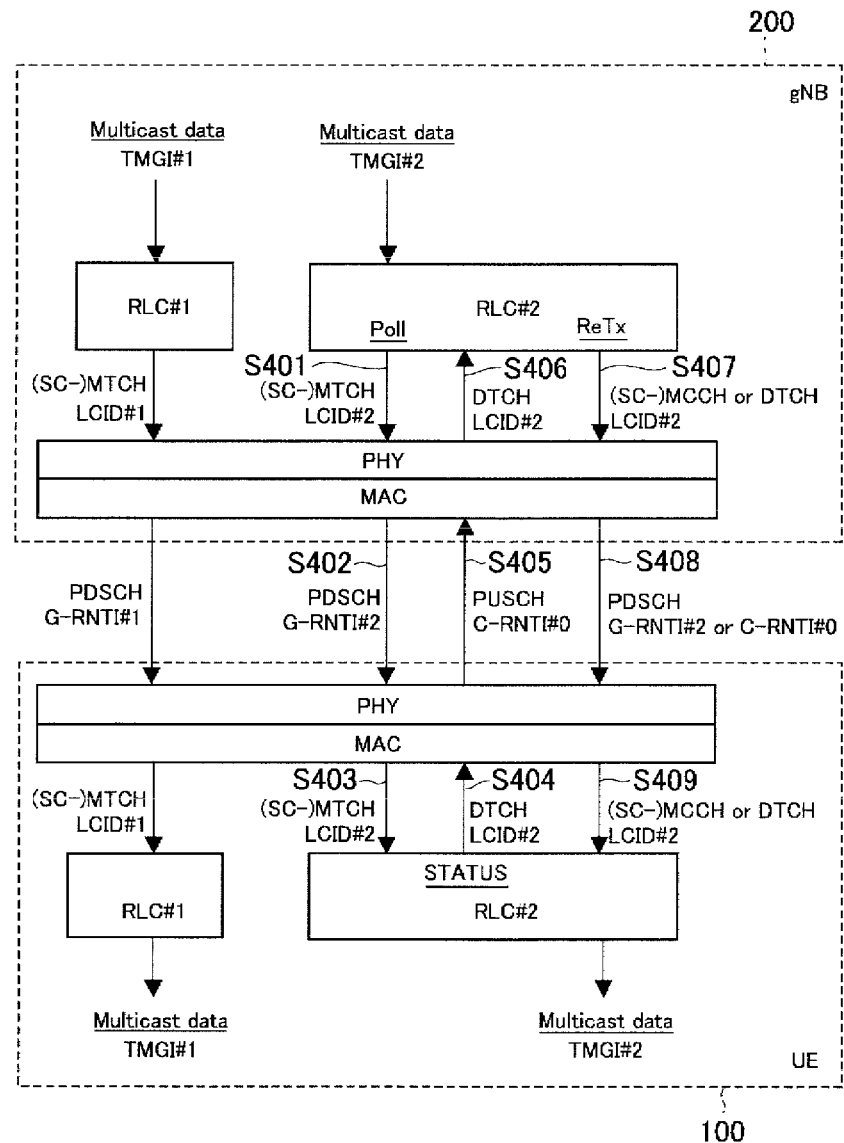
FIG. 11 is a diagram illustrating operations according to Variation 1.

FIG. 11 is a diagram illustrating operations according to Variation 1.

As illustrated in FIG. 11, the gNB 200 provides two MBS services to the UE 100. One MBS service is allocated "TMGI #1" as an MBS service identifier, and the other MBS service is allocated "TMGI #2" as an MBS service identifier.

The gNB 200 includes a transmission-side RLC entity #1 (RLC #1) that transmits MBS data (Multicast data) for the "TMGI #1" and a transmission-side RLC entity #2 (RLC #2) that transmits MBS data for the "TMGI #2." On the other hand, the UE 100 includes a reception-side RLC entity #1 (RLC #1) that receives MBS data for the "TMGI #1" and a reception-side RLC entity #2 (RLC #2) that receives MBS data for the "TMGI #2."

First, the gNB 200 configures, for the UE 100, the logical channel identifier for the MBS in association with the MBS service identifier (or group RNTI). In an example illustrated in FIG. 11, the gNB 200 configures "LCID #1" as a logical channel identifier corresponding to the "TMGI #1," and configures "LCID #2" as a logical channel identifier corresponding to the "TMGI #2." Thus, the logical channel identifier varies depending on MBS service identifier, and thus the logical channel identifier for feedback is also different and can be identified.

The gNB 200 configures the logical channel identifier for the UE 100 by including the logical channel identifier in system information (System Information Blocks (SIBs)) transmitted to the UE 100 via a broadcast control channel (BCCH), MBS control information transmitted to the UE 100 via the MBS control channel, or a message (e.g., an RRC message) transmitted to the UE 100 via UE dedicated signaling. The gNB 200 may configure, for the UE 100, a set of the logical channel identifiers and the MBS service identifier (e.g., the TMGI) and/or group RNTI.

In Variation 1, one logical channel identifier is used as both a logical channel identifier used for MBS reception and a logical channel identifier used for uplink transmission for feedback. In FIG. 11, the logical channel identifier "LCID #2" is allocated to an MBS traffic channel (e.g. (SC-)MTCH), which is a logical channel used for MBS reception, and also allocated to a logical channel (e.g., a DTCH) used for uplink transmission for feedback. Note that SC-MTCH is an abbreviation for a Single Cell Multicast Traffic Channel, and DTCH is an abbreviation for a Dedicated Traffic Channel.

In steps S401 to S403, the RLC entity #2 of the gNB 200 transmits MBS data to the UE 100 and an RLC polling packet to the UE 100 via the MBS traffic channel. Specifically, the gNB 200 transmits an RLC polling packet with a Polling bit (P) field included in the Acknowledged Mode Data (AMD) PDU set equal to 1. The RLC entity #2 of UE 100 receives the MBS data and the RLC polling packet from the gNB 200.

In steps S404 to S406, in response to receiving the polling packet, the RLC entity #2 of the UE 100 transmits the STATUS PDU including the ACK/NACK information of the MBS data, to the gNB 200 via the DTCH by using unicast. The RLC entity #2 of the gNB 200 receives the STATUS PDU from the UE 100.

In steps S407 to S409, based on the STATUS PDU, the RLC entity #2 of the gNB 200 retransmits a packet (RLC packet) that the UE 100 has failed to receive, to the UE 100 by MBS transmission or unicast transmission (DTCH). Here, for retransmission of the packet having failed to be received, the MBS control channel ((SC-) MCCH) is used for MBS transmission; however, the MBS traffic channel may be used for the retransmission.

(2) Variation 2

Variation 2 will be described while focusing on differences from Variation 1. In Variation 2, the gNB 200 configures different logical channel identifiers for the MBS transmission of the MBS data from the gNB 200 to the UE 100 and for the unicast transmission related to the MBS. The gNB 200 need not allocate a logical channel identifier for the MBS transmission of the MBS data from the gNB 200 to the UE 100.

That is, different logical channels are used for the MBS transmission of the MBS data from the gNB 200 to the UE 100 and for the unicast transmission related to the MBS. Accordingly, the gNB 200 includes, for one MBS service "TMGI #2," two RLC entities, the transmission-side RLC entity #1 that performs the MBS transmission and the reception-side RLC entity #2 that receives the feedback information. The UE 100 includes, for one MBS service "TMGI #2," two RLC entities, the reception-side RLC entity #1 that performs the MBS reception and the transmission-side RLC entity #2 that transmits the feedback information.

Under the above-described assumptions, the appropriate feedback to the gNB 200 requires coordinated operations between the reception-side RLC entity #1 and the transmission-side RLC entity #2 in the UE 100. In the UE 100, the reception-side RLC entity #1 notifies the transmission-side RLC entity #2 of the reception status of the MBS data (RLC packet).

The appropriate retransmission to the UE 100 requires coordinated operations between the transmission-side RLC entity #1 and the reception-side RLC entity #2 in the gNB 200. In the gNB 200, the reception-side RLC entity #2 notifies the transmission-side RLC entity #1 of the information of the STATUS PDU from the UE 100.

Figure 12:
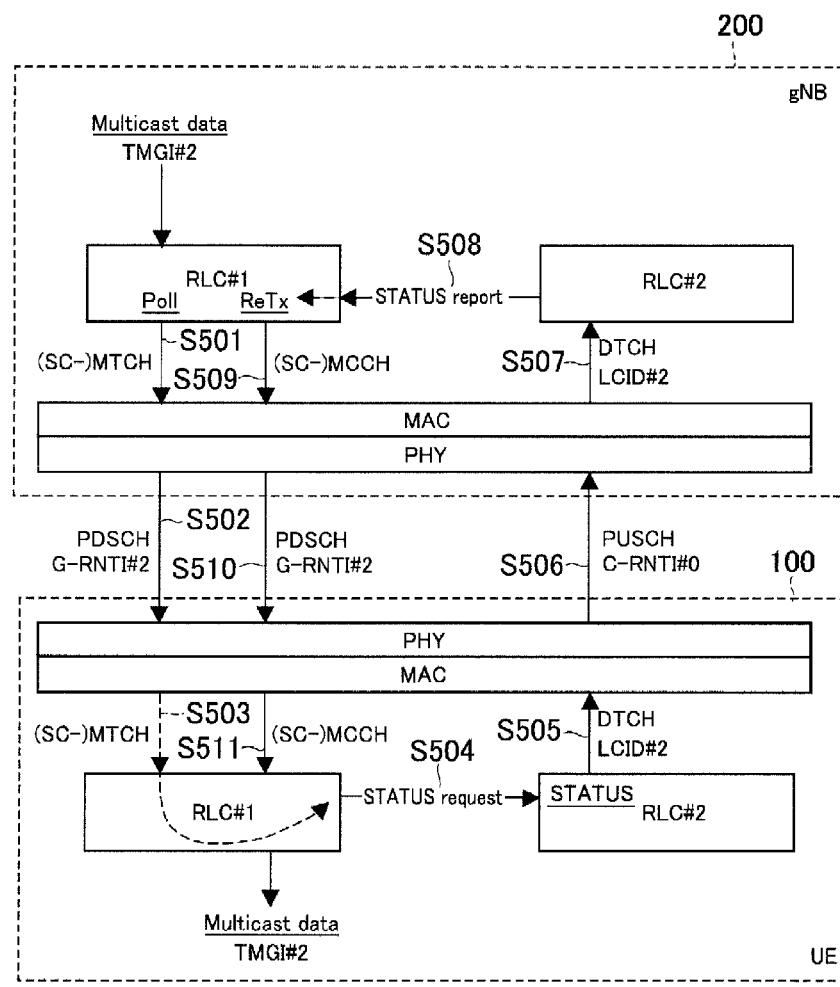
FIG. 12 is a diagram illustrating operations according to Variation 2.

FIG. 12 is a diagram illustrating operations according to Variation 2.

As illustrated in FIG. 12, the gNB 200 configures a unicast bearer for the UE 100, and associates the unicast bearer with the MBS bearer along with the logical channel identifier "LCID #2" (for feedback transmission). The association may be made between the logical channel identifier "LCID #2" and the MBS service identifier "TMGI #2."

In steps S501 to S503, the RLC entity #1 of the gNB 200 transmits the MBS data to the UE 100 via the MBS traffic channel, and transmits the RLC polling packet to the UE 100. The RLC entity #1 of UE 100 receives the MBS data and the RLC polling packet from the gNB 200.

In step S504, the RLC entity #1 of the UE 100 notifies the RLC entity #2 corresponding to the above-described associated logical channel identifier "LCID #2" of information for generating the STATUS PDU (e.g., the ACK/NACK for each sequence number, specifically each piece of field information of the RLCSTATUS PDU). The notification may be performed via the upper layer (such as the RRC layer).

In step S505, the RLC entity #2 of the UE 100 generates a STATUS PDU based on the notification information received from the RLC entity #1, and delivers the STATUS PDU to the lower layer (MAC).

In step S506, the PHY layer of the UE 100 transmits the STATUS PDU to the gNB 200 via a Physical Uplink Shared CHannel (PUSCH).

In step S507, the RLC entity #2 of the gNB 200 notifies the corresponding MBS RLC entity #1 of the information of the STATUS PDU from the UE 100. The notification may be performed via the upper layer (such as the RRC layer).

In steps S509 to S511, based on the STATUS PDU, the RLC entity #1 of the gNB 200 retransmits a packet (RLC packet) that the UE 100 has failed to receive, to the UE 100 by MBS transmission. Here, for retransmission of the packet having failed to be received, the MBS control channel ((SC-) MCCH) is used for MBS transmission; however, the MBS traffic channel may be used for the retransmission.

(3) Variation 3

Variation 3 will be described while focusing on differences from Variations 1 and 2. In Variation 1, an identical logical channel identifier is configured for both the MBS transmission of the MBS data from the gNB 200 to the UE 100 and the feedback transmission from the UE 100 to the gNB 200. In contrast, in Variation 3, the gNB 200 configures an identical logical channel identifier for both the MBS transmission of the MBS data from the gNB 200 to the UE 100 and the unicast transmission from the gNB 200 to the UE 100 (specifically, the unicast transmission of the MBS data).

In Variation 3, the RLC entity of the gNB 200 maps the MBS data to the MBS traffic channel and/or the unicast traffic channel. Thus, with the identical logical channel used for both the MBS transmission and unicast transmission of the MBS data from the gNB 200 to the UE 100, use of two paths (MBS traffic channel and unicast traffic channel) enables high-reliability communication.

Figure 13:
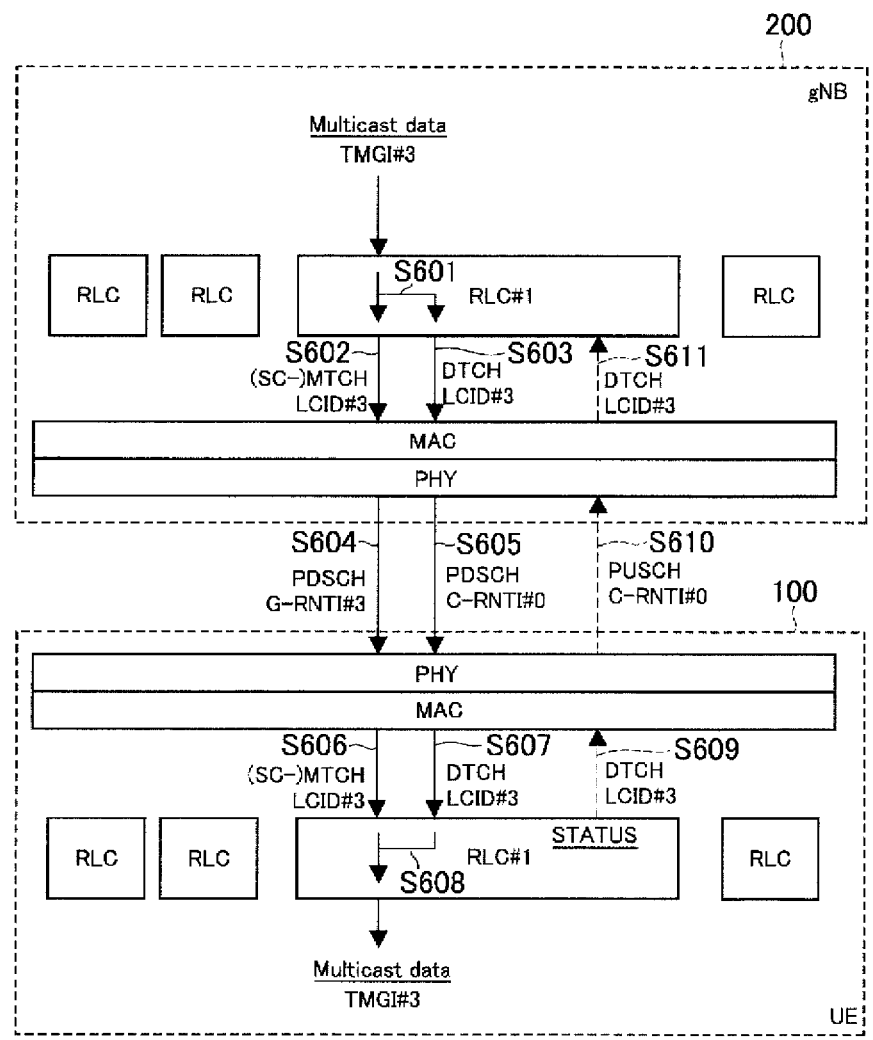
FIG. 13 is a diagram illustrating operations according to Variation 3.

FIG. 13 is a diagram illustrating operations according to Variation 3.

As illustrated in FIG. 13, the gNB 200 configures an identical logical channel identifier "LCID #3" for both MBS and unicast. The method of the configuration is the same as, and/or similar to, that in Variation 1 described above. Note that the gNB 200 may, for example, configure the MBS logical channel identifier by using the MBS control channel, and configure the unicast logical channel identifier (the same as the MBS logical channel identifier) by using the UE dedicated signaling.

In step S601, the RLC entity #1 of the gNB 200 switches an output path for the input data (MBS data). For example, the RLC entity #1 of the gNB 200 performs mapping to the MBS traffic channel for MBS transmission, while performing mapping to the DTCH for unicast transmission.

Here, the RLC entity #1 of the gNB 200 may perform duplication transmission. In this case, the RLC entity #1 of the gNB 200 replicates the RLC PDU, and maps one of the resultant RLC PDUs to the MBS traffic channel, while mapping the other to the DTCH. Note that a PDU to be replicated and another PDU resulting from the replication have the same RLC sequence number (i.e., the replication is performed after the sequence number is assigned).

In step S602 and/or step S603, the RLC entity #1 of the gNB 200 delivers the data (AMD PDU or UMD PDU) to the logical channel of the mapping destination.

In step S604 and/or step S605, the PHY layer (PHY entity) of the gNB 200 performs PDSCH transmission by using the G-RNTI for the MBS traffic channel and using the C-RNTI for the DTCH. The PHY layer of the UE 100 performs PHY processing, and receives the PDSCH.

In step S606 and/or step S607, the MAC layer (MAC entity) of the UE 100 performs MAC processing, demaps the MBS control channel and/or the DTCH, and delivers the data to the RLC entity #1 corresponding to the logical channel identifier.

In step S608, the RLC entity #1 of the UE 100 performs RLC processing, retrieves the MBS data, and delivers the data to the upper layer. Here, the RLC entity #1 of the UE 100 collectively performs order control, retransmission control, and the like, independently of the MBS control channel and the DTCH.

When the polling bit field is "1," in steps S609 to S611, the RLC entity #1 of the UE 100 transmits the STATUS PDU through the DTCH.

OTHER EMBODIMENTS

The embodiments and variations described above can not only be separately and independently implemented, but can also be implemented in combination of two or more of the embodiments and/or two or more of the variations.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variations can be made without departing from the gist of the present disclosure.

The invention claimed is:

1. A communication control method used in a mobile communication system comprising a base station for providing a multicast broadcast service (MBS) to a user equipment, the communication control method comprising:
transmitting, by the base station configured to transmit MBS data via an MBS bearer, to the user equipment, information configuring the user equipment with an identifier identifying a point-to-point (PTP) logical channel associated to the MBS bearer and an identifier identifying a point-to-multipoint (PTM) logical channel associated to the MBS bearer, wherein
the MBS bearer is associated with each of a first Radio Link Control (RLC) entity configured for PTM reception and a second RLC entity configured for PTP transmission,
the first RLC entity is associated with the PTM logical channel, and
the second RLC entity is associated with the PTP logical channel.

2. A user equipment comprising:
a receiver configured to receive from a base station configured to transmit multicast broadcast service (MBS) data via an MBS bearer, information configuring the user equipment with an identifier identifying a point-to-point (PTP) logical channel associated to the MBS bearer and an identifier identifying a point-to-multipoint (PTM) logical channel associated to the MBS bearer, wherein
the MBS bearer is associated with each of a first Radio Link Control (RLC) entity configured for PTM reception and a second RLC entity configured for PTP transmission,
the first RLC entity is associated with the PTM logical channel, and
the second RLC entity is associated with the PTP logical channel.

3. An apparatus for controlling a user equipment, the apparatus comprising a processor and a memory, the processor configured to
receive from a base station configured to transmit multicast broadcast service (MBS) data via an MBS bearer, information configuring the user equipment with an identifier identifying a point-to-point (PTP) logical channel associated to the MBS bearer and an identifier identifying a point-to-multipoint (PTM) logical channel associated to the MBS bearer, wherein
the MBS bearer is associated with each of a first Radio Link Control (RLC) entity configured for PTM reception and a second RLC entity configured for PTP transmission,
the first RLC entity is associated with the PTM logical channel, and
the second RLC entity is associated with the PTP logical channel.

4. A base station configured to transmit multicast broadcast service (MBS) data via an MBS bearer, the base station comprising:
a transmitter configured to transmit to a user equipment, information configuring the user equipment with an identifier identifying a point-to-point (PTP) logical channel associated to the MBS bearer and an identifier identifying a point-to-multipoint (PTM) logical channel associated to the MBS bearer, wherein
the MBS bearer is associated with each of a first Radio Link Control (RLC) entity configured for PTM reception and a second RLC entity configured for PTP transmission,
the first RLC entity is associated with the PTM logical channel, and
the second RLC entity is associated with the PTP logical channel.

5. The communication control method according to claim 1, wherein
the PTP logical channel is a logical channel for the user equipment to transmit feedback information of a Radio Link Control (RLC) layer for the MBS data to the base station.

6. The communication control method according to claim 1, wherein
the user equipment includes the first RLC entity and the second RLC entity,
the first RLC entity notifies the second RLC entity of a reception status of an RLC packet of the MBS data.

* * * * *